United States Patent [19]
Koerner et al.

[11] Patent Number: 6,034,525
[45] Date of Patent: Mar. 7, 2000

[54] METHOD AND APPARATUS FOR DETECTING ROTATIONAL DIRECTION OF A TWO CYCLE ENGINE

[75] Inventors: Scott A. Koerner, Kenosha, Wis.; Paul T. Ng, Vernon Hills, Ill.

[73] Assignee: Outboard Marine Corporation, Waukegan, Ill.

[21] Appl. No.: 09/200,015

[22] Filed: Nov. 25, 1998

Related U.S. Application Data

[63] Continuation of application No. PCT/US97/10602, Jun. 19, 1997
[60] Provisional application No. 60/020,246, Jun. 21, 1996.

[51] Int. Cl.[7] .............................. G01P 13/04; G01B 7/14
[52] U.S. Cl. ....................................... 324/165; 324/207.25
[58] Field of Search ........................ 324/207.25, 207.24, 324/207.2, 173, 174, 165; 73/488, 514.31, 116

[56] References Cited

U.S. PATENT DOCUMENTS

| | | | |
|---|---|---|---|
| 3,096,444 | 7/1963 | Seward | 324/165 |
| 3,304,434 | 2/1967 | Koster | 324/165 |
| 4,228,396 | 10/1980 | Palombo et al. | 324/163 |
| 4,766,865 | 8/1988 | Hartel | 123/414 |
| 4,789,826 | 12/1988 | Willett | 324/208 |
| 4,926,822 | 5/1990 | Abe et al. | 123/414 |
| 5,044,336 | 9/1991 | Fukui | 123/414 |
| 5,086,272 | 2/1992 | Hinrichsen | 324/207.13 |
| 5,099,811 | 3/1992 | Frantz et al. | 123/416 |
| 5,184,590 | 2/1993 | Hashimoto et al. | 123/414 |
| 5,245,968 | 9/1993 | Kolias et al. | 123/414 |
| 5,264,789 | 11/1993 | Braun et al. | 324/165 |
| 5,325,710 | 7/1994 | Morikawa | 73/116 |
| 5,460,134 | 10/1995 | Ott et al. | 123/476 |
| 5,497,748 | 3/1996 | Ott et al. | 123/414 |
| 5,523,679 | 6/1996 | Kalb | 324/165 |

OTHER PUBLICATIONS

L. Equizabal, "Hall–effect tachometer senses speed, direction of rotation", *Electronics*,, Aug. 28, 1980. Vancouver, British Columbia, Canada.

*Primary Examiner*—Hezron Williams
*Assistant Examiner*—Helen C. Kwok
*Attorney, Agent, or Firm*—Fletcher, Yoder & Van Someren

[57] ABSTRACT

A system for determining the direction of rotation of the crankshaft of an internal combustion engine includes a sensor assembly for generating a crank rotation direction signal. The sensor assembly includes a stator having a sprocket fixed to the crank and having a plurality of teeth. The rotation of the crank, and the sprocket with the crank, results in changes in the magnetic field, and such changes or flux create a current in a conductor. The rotor also includes, at one angular location about the sprocket, a first interruption that serves as a first reference point or marker. The interruption in the sprocket teeth creates an irregularity in the magnetic flux and, consequently in the generated current or signal. The rotor also includes a second interruption or marker at an angle other than 1800 from the first marker. The second interruption differs physically from the first interruption, so that a second irregularity which is distinguishable from the first irregularity occurs in the generated signal. The pattern of the generated signal, in combination with the known angular displacement of the first and second markers, provides sufficient information from which the direction of rotation of the crankshaft can be readily determined.

4 Claims, 2 Drawing Sheets

CRANK SIGNAL GENERATION & RECOGNITION

METHOD AND APPARATUS FOR DETECTING ROTATIONAL DIRECTION OF A TWO CYCLE ENGINE

CROSS-REFERENCE TO RELATED APPLICATION

This application is a continuation of copending International Application Ser. No. PCT/US97/10602, filed Jun. 19, 1997 claiming the benefit of United States Provisional Application Ser. No. 60/020,246, filed Jun. 21, 1996.

BACKGROUND OF THE INVENTION

1. Field of the Invention

The invention relates generally to methods and apparatus for generating a signal for controlling engine operation, and more particularly to methods and apparatus for generating a control signal corresponding to rotation of a component of an engine.

2. Related Prior Art

It is generally known to measure the speed of a rotating member by generating and monitoring an electrical signal corresponding to the speed of the rotating member. One common method for generating such a signal is to fix a sprocket on the rotating member so that the teeth of the sprocket rotate in a plane perpendicular to the axis of rotation, and to provide a magnetic field and a conductor in the proximity of the sprocket. Rotation of the sprocket teeth through the magnetic field induces an electrical current in the conductor, and the frequency of the current will correspond to passage of the teeth through the magnetic field. The frequency of the current, in combination with the known angular spacing of the teeth, provides sufficient information from which the average rotational speed of the member can be calculated over a known period of time.

SUMMARY OF THE INVENTION

In most applications using the above described apparatus and method to determine the rotational speed of a member, the direction of rotation of the member is not a concern. In particular, in applications wherein the rotational speed of a crankshaft of a four-cycle engine is to be monitored, the direction of rotation is not a concern because the crankshaft can rotate in only a single direction. However, in the operation of two-cycle engines, it is known that such engines will occasionally counterrotate, i.e., operate so that the crankshaft rotates in the direction opposite to the intended direction of rotation. In such an event, it is important to stop operation of the engine as quickly as possible to prevent possible damage to the engine.

In one embodiment, the invention provides an apparatus for nearly immediately determining the direction of rotation of a rotating member, such as the crankshaft of an internal combustion engine. The apparatus includes a first marker fixed to the rotating member, a second marker fixed to the rotating member and displaced a predetermined angular distance from the first marker, and a sensor for detecting passage of the first and second markers. In one embodiment, the sensor includes a transducer creating a magnetic field located in proximity to the rotating member, and a conductor located in the magnetic field.

More particularly, the invention provides a sensor assembly for generating a crank rotation direction signal. The sensor assembly includes a stator having a sprocket fixed to the crank and having a plurality of teeth. The rotation of the crank, and the sprocket with the crank, results in changes in the magnetic field, and such changes or flux create a current in the conductor. The rotor also includes, at one angular location about the sprocket, a first interruption that serves as a first reference point or marker. The interruption in the sprocket teeth creates an irregularity in the magnetic flux and, consequently, in the generated current or signal. The rotor also includes a second interruption or marker on the sprocket displaced from the first marker at an angle other than 1800 from the first marker. The second interruption differs physically from the first interruption, so that a second irregularity which is distinguishable from the first irregularity occurs in the generated signal. The pattern of the generated signal, in combination with the known angular displacement of the first and second markers, provides sufficient information from which the direction of rotation of the shaft can be readily determined.

In another embodiment, the invention provides a method for determining the direction of rotation of a rotating member. The method includes the steps of providing a member rotating in common with the rotating member and having first and second markers located on distinct diameters of the rotating member, detecting passage of the first and second markers, and comparing the detected angular distance between the first and second markers with the known angular distance between the first and second markers. In one embodiment, the step of detecting the passage of the markers includes the step of providing a magnetic field surrounding at least a portion of the rotating member, providing a conductor located in the magnetic field for conducting a signal, receiving a signal generated by rotation of the member in the magnetic field, and comparing the angular displacement of the irregularities in the signal caused by the first and second markers with the know angular displacement of the markers.

Other features and advantages of the invention will become apparent to those skilled in the art upon review of the following detailed description, claims and drawings.

Figure 1:
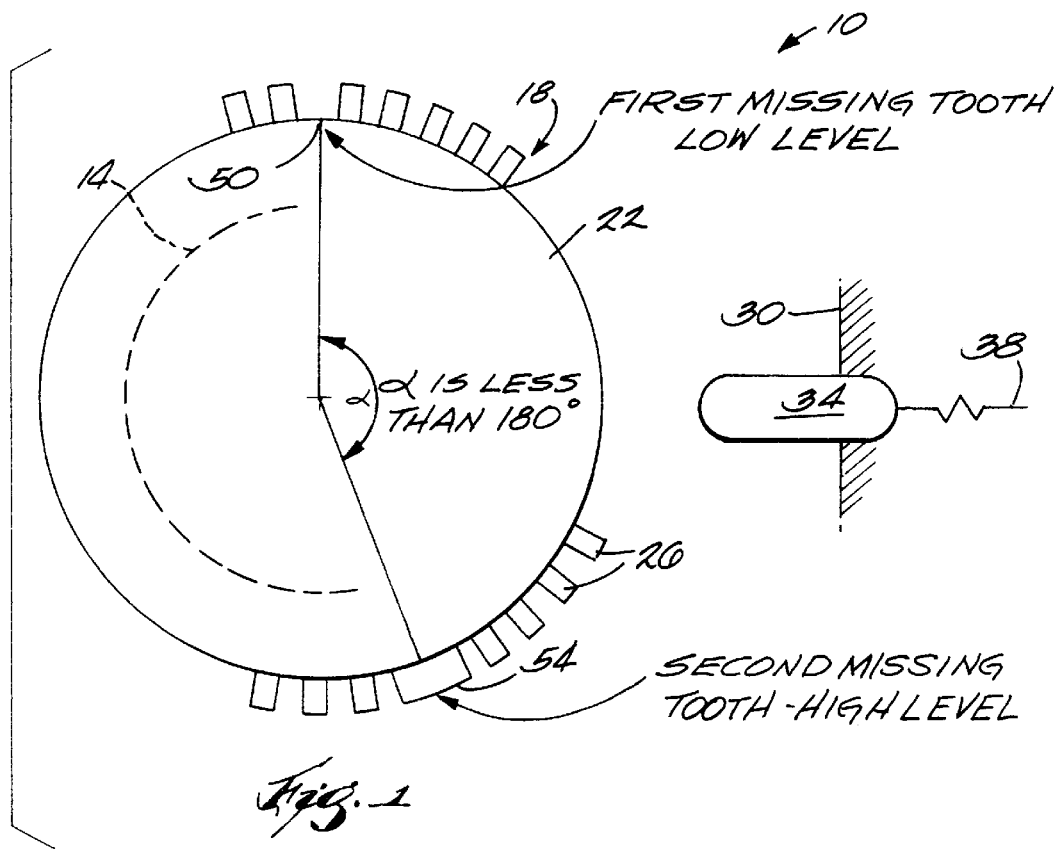
FIG. 1 is a schematic illustration of a signal generating apparatus embodying the invention.

Before several embodiments of the invention are explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

The drawings illustrate a sensor assembly 10 for generating a control signal indicating the rotational direction of a rotating member. In use, the sensor assembly 10 generates a control signal indicating the rotational speed and direction of a rotating component, such as a flywheel or crankshaft 14, of an internal combustion engine (not shown).

It is contemplated that the sensor assembly 10 will be used in association with a twocycle engine, although the invention is not limited to such an application.

The sensor assembly 10 includes a rotor 18 mounted on 30 and fixed to the shaft 14 for common rotation with the shaft 14. The rotor 18 typically comprises an annular member 22 having a plurality of circumferentially-spaced, radially extending portions. For example, the rotor 18 may comprise alternating magnetic poles or spaced ferromagnetic teeth 26.

Figure 3:
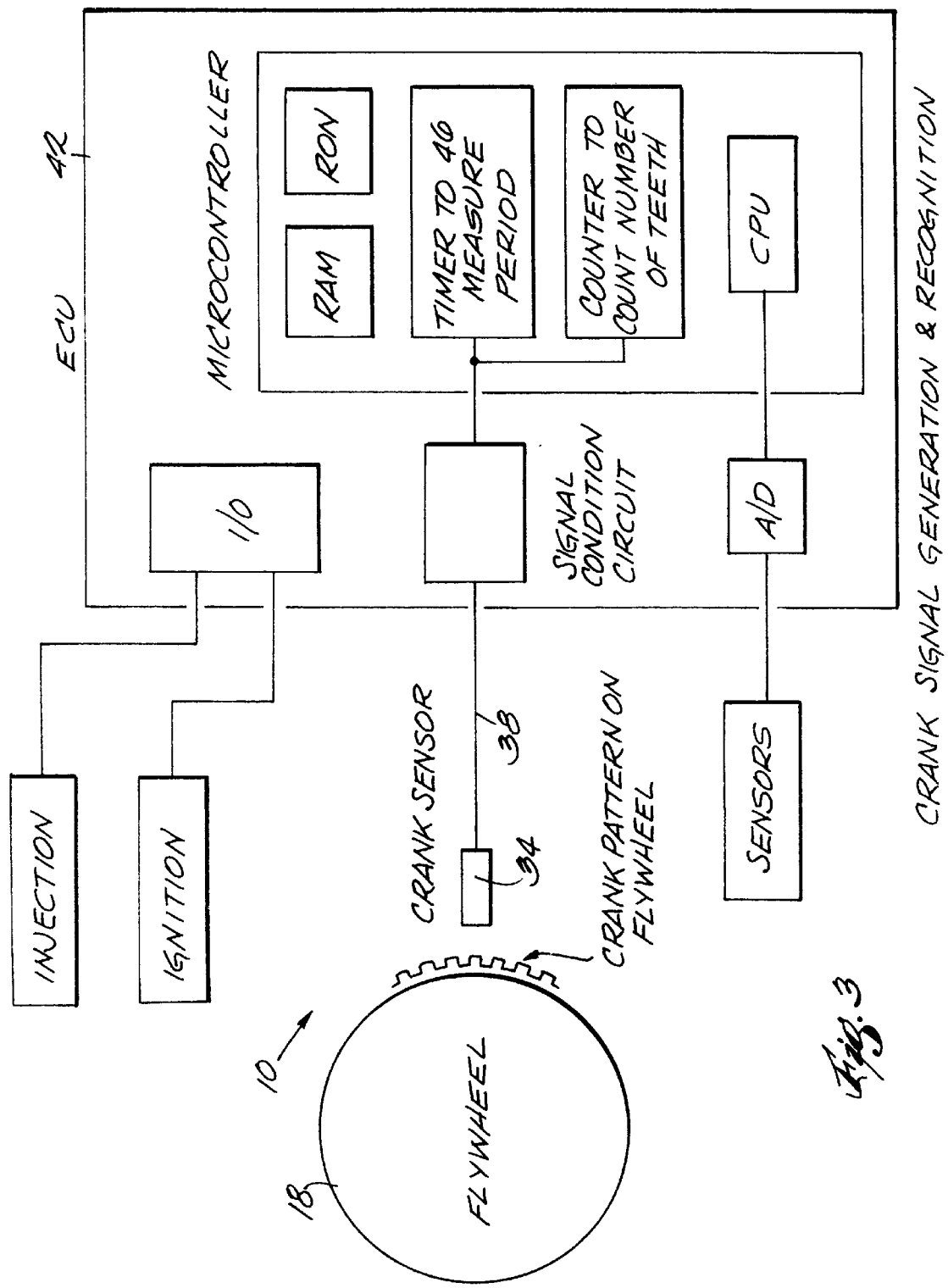
FIG. 3 is a schematic diagram of a control system for a two-cycle engine incorporating the signal generating apparatus shown in FIG. 1.

The sensor assembly 10 also includes a stator 30 which is mounted on a portion of the engine which is stationary relative to the rotor 18. The stator 30 is positioned in close proximity to the rotor 18 and can sense the teeth 26 on the rotor 18 as they rotate relative to the stator 30. The stator 30 includes a ferromagnetic transducer 34 which creates a magnetic field. The transducer 34 includes a 5 coil (not shown) formed of thin wire and a terminal (not shown) operatively connected to the coil. Alternatively, the transducer 34 can include a Hall effect sensor (not shown) for detecting changes in flux and for generating a control signal without utilizing a coil. The stator 30 further includes an electrical signal path (e.g., an electrical terminal and electrical wire) 38 operatively connected to the transducer 34 for conducting the control signal to the appropriate vehicle control device, such as an electronic control unit ("ECU") 42 (shown in FIG. 3).

Rotation of the rotor 18 in the magnetic field of the transducer 34 causes magnetic flux and generates electrical current in the coil and the conducting path 38. The frequency of the current varies with the passing of the teeth 26 past the transducer 34 and thus provides a control signal having a profile which can be used to determine the speed and direction of the shaft's rotation in a manner discussed below.

More particularly, the ECU 42 can calculate rotational speed of the shaft 14 from the input of a signal from (FIG. 3) an internal clock 46 and the input of the control signal from the sensor assembly 10. The ECU 42 is operable to recognize the rises and falls in the signal profile as indicating the movement of a known number of teeth 26 the rotor 18 past the stator 30. Such information, with the known spacing of the teeth can be used to calculate the rate of shaft rotation.

In order to generate a signal that can also be used to detect the direction of rotation of the shaft 14, the sensor assembly 10 also includes a pair of markers on the rotor 18 that produce respective characteristic anomalies in the profile of the control signal which is detected by the ECU 42.

Figure 2:
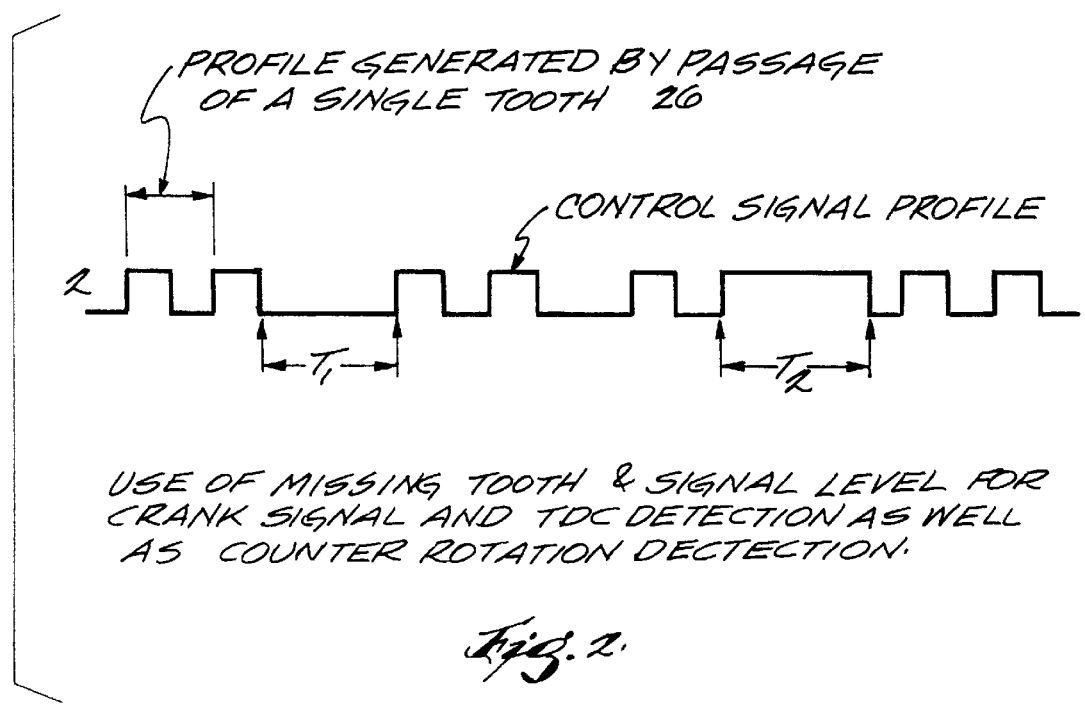
FIG. 2 is a diagram illustrating a profile of the signal generated by the apparatus shown in FIG. 1.

More particularly, the annular member 22 includes a first marker 50 which is located at a fixed point on the rotor 18 and which creates a characteristic anomaly in the profile of the signal. In the preferred embodiment, the marker 50 is in the form of an interruption in the teeth 26 on the annular member 22. The interruption can be created by simply removing a tooth from the annular member 22. The interruption caused by the first marker 50 creates a corresponding irregularity in the magnetic flux and, consequently, in the generated current or signal. In the preferred embodiment, the passage of the first marker 50 past the stator 30 constitutes the passage of an elongated gap or "low point" past the transducer 34 and (FIG. 2) generates an elongated interval of no change in the profile of the control signal extending between two low points in the profile. This interval is identified as T1 in FIG. 2, and is recognizable by the ECU 42 as indicating the passage of the first marker 50 past the transducer 34.

The annular member 22 also includes (FIG. 1) a second 20 marker 54 fixed relative to the rotor 18. The second marker 54 is circumferentially spaced from the first marker 50 at an angular displacement of other than 1800, i.e., the first and second markers 50, 54 lie on distinct diameters of the annular member 22. In FIG. 1, the angular displacement between the first and second markers 50, 54 is indicated by the symbol a and a=1800.

The second marker 54 is configured differently from the first marker 50 so that passage of the second marker 54 past the transducer 34 creates an anomalous interruption in the control signal distinct from the interruption characteristic of passage of the first marker 50. In the preferred embodiment, the second marker 54 or interruption in the teeth 26 is formed by joining adjacent teeth 26 on the annular member 22, i.e., by filling in the gap between adjacent teeth 26 with ferromagnetic material. In the preferred embodiment, the passage of the second marker 54 past the stator 30 constitutes the passage of an elongated gap or "high point" past the transducer 34 and generates (FIG. 2) an elongated interval of no change in the profile of the control signal extending between two high points in the profile. This interval is identified as T2 in FIG. 2, and is recognizable by the ECU 42 as indicating the passage of the second marker 54 past the transducer 34.

The pattern of the generated control signal, in combination with the known angular displacement of the first and second markers 50 and 54, provides sufficient information from which the direction of rotation of the shaft 14 can be readily determined by the ECU 42. Assuming that the annular member is oriented so that upon the initiation of rotation of the shaft 14 the first marker 50 passes the transducer 34 before the second marker 54 passes the transducer 34, in the event that the shaft 14 rotates in the proper direction of rotation, the ECU 42 will first receive and recognize the signal T1. The second marker 54 will then pass the transducer 34, and the ECU will be subsequently receive and recognize the signal T2. Because the rotation of the shaft 14 is proper, the anomalies of apart at 20 the first and second markers 50, 54 will be spaced at the proper angular displacement, i.e., the intervals T1 and T2 will be displaced by an interval of rotation equal to a degrees. However, in the event of counter-rotation of the shaft 14 and assuming T1 is first received by the ECU 42, the angular displacement between the respective first and second anomalies, i.e., intervals T1 and T2 in the profile of the control signal caused by passage of the first and second markers 50, 54, will be 3600-a, which would differ from the expected or known angular displacement. Upon such an occurrence, the ECU 42 will initiate engine shutdown.

Similarly, if the shaft 14 is oriented so that the second marker 54 first passes the transducer 34, the ECU 42 would first receive and recognize the interruption T2, and would next receive interruption T1. Upon first receiving T2, the ECU 42 would anticipate receiving T1, at the interval of 3600-a. If T1 is not received at the anticipated angular displacement, then engine shutdown would occur.

From the foregoing, it will be apparent that setting a to be less than 1800 (a<1800) provides advantage. More particularly, if a<1800, then in the event of counterrotation, the ECU 42 will count rises in the control signal corresponding to the passage of a sufficient number of teeth 26 past the transducer 34 equal to an angular displacement of <after first receiving the signature of the first marker 50. If the ECU 42 does not thereafter immediately receive the signature of the second marker 54, the ECU logic will recognize the absence of the second marker 54 as indicating a counter-rotation condition. The ECU 42 can then shut the engine down. In the event T2 is first received by the ECU 42 and T1 is thereafter received after a displacement of a, which would be earlier than the anticipated 3600-a if a<1800, then the ECU would recognize a counter-rotation condition and initiate engine shutdown.

An alternative methodology for determining counter rotation utilizing the assembly 10 is also possible without the determination of either engine speed or angular displacement of the shaft 14. In particular, the direction of rotation of the shaft 14 can be determined by the ECU 42 by permitting the shaft 14 to pass through a full rotation after either the first marker or the second marker 50, 54 encounters the transducer 34. Upon either marker 50 or 54 passing the transducer 34, the ECU 42 will receive and recognize a respective signal, either T1 or T2 and then receive the other of the respective signals upon further rotation of the shaft 14. The shaft 14 will then further rotate through a complete revolution. The ECU 42 will be able to compare the elapsed time between the first received and second received signals, and between the second received signal and the completion of the full rotation. The comparison of elapsed times will correlate to the unequal angular displacements between the first and second markers 50 and 54, and provide an indication of the direction of rotation.

The sensor assembly 10 thus provides a simple mechanical construction that can indicate a counter-rotation condition in one rotation of the rotor 18, and most likely less than a one-half of a full revolution of the rotor 18.

The invention thus also provides a method for detecting a counter-rotation condition of a shaft. More particularly, the method includes the steps of providing a member rotating in common with the shaft 14 and having first and second markers 50, 54 located on distinct diameters of the shaft 14, detecting passage of the first and second markers 50, 54, and comparing the detected angular distance between the first and second markers 50 54 with a known angular distance a between the first and second markers. The step of detecting the passage of the markers 50, 54 can further include the step of providing a magnetic field surrounding at least a portion of the rotating member, providing a conductor 38 located in the magnetic field for conducting a signal, receiving a signal generated by rotation of the member in the magnetic field, and comparing the angular displacement of the irregularities in the signal caused by the first and second markers 50, 54 with the know angular displacement a of the markers 50, 54.

Other features and advantages of the invention are set forth in the following claims.

We claim:

1. A sensor assembly for generating a signal indicating the direction of rotation of a rotating member, the assembly comprising:

a first marker fixed to the rotating member at a first angular position;

a second marker fixed to the rotating member at a second angular position other than 180 degrees from the first marker;

a first sensor for detecting passage of said first and second markers at first and second time intervals and generating first and second corresponding signals representing said first and second angular positions; and, a second sensor for comparing the time intervals between said first and second signals to determine the direction of rotation of said rotating member.

2. A method for detecting a counter-rotation condition of a shaft comprising the steps of:

providing a member rotating in common with the shaft with first and second markers located on different diameters of the shaft and circumferentially spaced thereon at a known angular distance other than 180 degrees apart;

detecting a passage of said first and second markers; and comparing a detected angular distance between said first and second markers with the known angular distance between said first and second markers for a given directional rotation of said shaft.

3. A sensor assembly for generating a signal indicating the direction of rotation of a rotating member, the assembly comprising:

a first marker fixed to the rotating member at a first angular position;

a second marker fixed to the rotating member at a second angular position other than 180 degrees from the first marker;

a single transducer located in proximity to the rotating member for detecting passage of said first and second markers and generating signals representing a time interval between said first and second angular positions; and, a rotation direction detector coupled to said single transducer for comparing said time interval with a known time interval to determine the direction of rotation of said rotating member.

4. A method for detecting a counter-rotation condition of a shaft comprising the steps of:

locating first and second markers on the shaft at a known angular displacement with respect to each other;

detecting a passage of said first and second markers with a single sensor;

generating first and second signals corresponding to the passage of said first and second markers, each of said first and second signals having a distinctly different irregularity; and comparing an angular displacement of the irregularities in the signals caused by the first and second markers with the known angular displacement of the first and second markers to determine the direction of rotation of said shaft.

* * * * *